United States Patent [19]
Shell

[11] 3,973,348
[45] Aug. 10, 1976

[54] REMOVABLE HAND GRIP FOR FISHING ROD HANDLE

[76] Inventor: Timothy F. Shell, 1023 N. Fourth, St. Clair, Mich. 48079

[22] Filed: Mar. 27, 1975

[21] Appl. No.: 562,724

[52] U.S. Cl. ............................................... 43/23
[51] Int. Cl.² ....................................... A01K 87/00
[58] Field of Search ............. 43/22, 23, 25; 273/75, 273/81 D, 165, 81.2, 72

[56] References Cited
UNITED STATES PATENTS

| | | | |
|---|---|---|---|
| 1,617,972 | 2/1927 | Wallace | 273/81.2 |
| 1,701,856 | 2/1929 | Kraeuter | 43/23 |
| 3,274,616 | 9/1966 | Russo | 273/165 |
| 3,410,017 | 11/1968 | Wilson | 43/22 |

Primary Examiner—Warner H. Camp
Attorney, Agent, or Firm—Reising, Ethington, Barnard, Perry & Brooks

[57] ABSTRACT

A removable hand grip for use on a fishing rod handle of the type that mounts a reel having a stem projecting outwardly from the handle. The grip has a sheet like construction made from generally flexible material and is wrapped about the handle so that opposite edge portions thereof are overlapped. Each of the overlappd edge portions includes a pair of spaced flanges having adjacent ends defining an opening, and the openings receive the reel stem from opposite sides to completely cover the handle around the stem. Velcro strips on the flanges detachably secure the overlapped edge portions to each other and thereby removably secure the grip to the handle. The flanges of each edge portion have V-shaped configurations causing the grip to taper away from the reel stem in opposite directions along the handle with frustoconical configurations so the grip can accommodate a base of the reel stem which mounts the stem to a reel seat on the handle. The flexible sheet like construction of the grip is provided by two layers of cloth that are secured to each other with a layer of foam padding therebetween so the grip has a padded feel.

9 Claims, 4 Drawing Figures

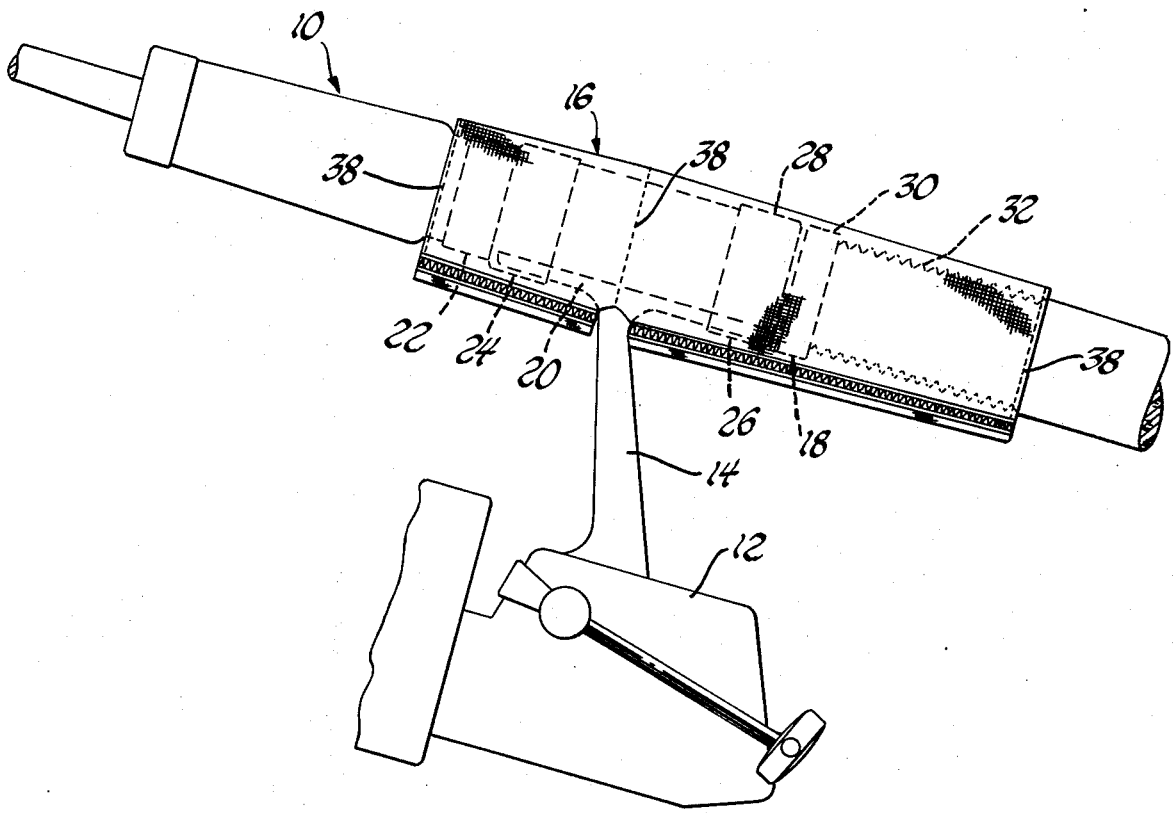
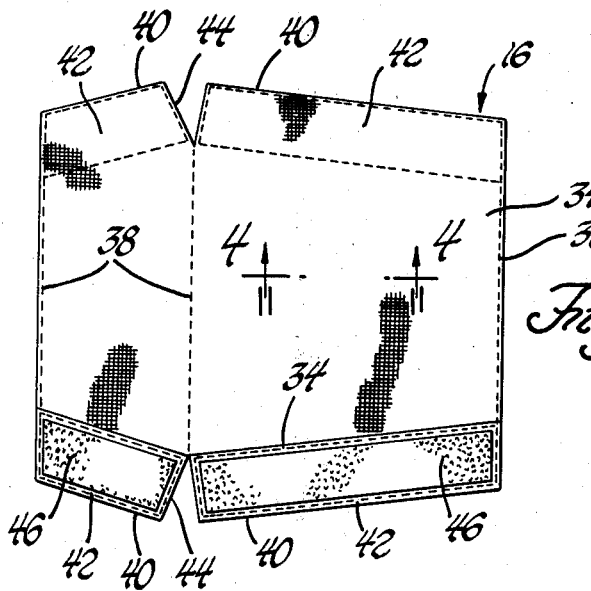
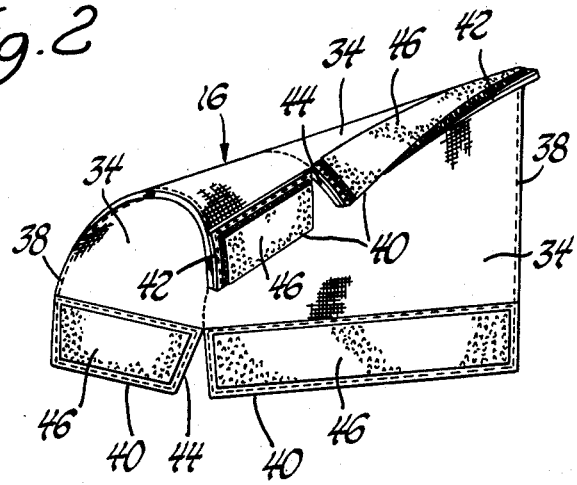
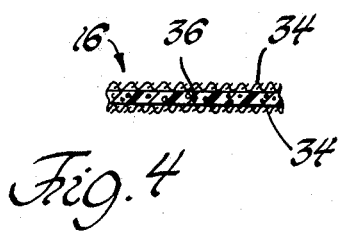
Fig. 1
Fig. 2
Fig. 3
Fig. 4

REMOVABLE HAND GRIP FOR FISHING ROD HANDLE

BACKGROUND OF THE INVENTION

1. Field of the Invention

This invention relates generally to a removable hand grip for use on a fishing rod handle, and more specifically to a removable hand grip for use on a fishing rod handle of the type that mounts a reel by way of a stem that projects outwardly from the handle.

2. Description of the Prior Art

Fishing rods of the type that mount spinning reels include a handle having a reel seat that mounts the reel. The reel includes a stem with a base that is mounted on the handle by the reel seat and the mounted stem projects downwardly from the rod in use so that the reel is spaced from the rod. The reel seat on the handle ordinarily includes a pair of metal attachment rings extending about a metal portion of the rod handle. One of the rings is either fixed with respect to the handle or engaged with a suitable stop, and the other attachment ring is slidable along the handle. The attachment rings both include enlarge portions that receive opposite ends of the stem base upon mounting of the reel to the handle. A metal adjustment ring threaded about the handle is manually rotated in one direction so that it moves toward the slidable attachment ring and thereby moves the slidable attachment ring toward the fixed one to secure the stem base therebetween in a fixed condition on the handle. The adjustment ring is manually rotated in the other direction so it moves away from the slidable attachment ring, and the reel is then detached from the handle by sliding the slidable attachment ring away from the fixed one to release the stem base.

Holding of a spinning rod in a properly balanced manner requires the user to grasp the rod handle adjacent its reel seat, usually with one or more fingers placed on both sides of the reel stem that projects outwardly from the handle. The proper holding of the rod can cause fatigue over extended periods of use due to the uneven nature of the reel seat components where the handle is grasped. This is especially true during colder weather due to the metallic nature of the reel seat components.

Hand grips have been devised in the past to cover a spinning rod handle at its reel seat to provide comfort in holding the rod. Usually, such grips are of a tubular configuration so that the rod handle is inserted through the grip. An axial slit in the grip may be used to receive the reel stem as the grip is moved over the reel seat. Rod hand grips of the tubular type have also been made of a two-piece construction so that each portion is moved onto the handle from an opposite end thereof toward each other with their engagement at the reel stem providing the mounted position. Also, rod hand grips have been made from a resilient material such as plastic in a one-piece construction with an axial slit along its whole length so as to permit the grip to be placed over the rod handle intermediate its ends at the reel seat. However, the resilient nature of such a grip can cause difficulty in separating the grip at its axial slit to provide its mounting. Fishing rod hand grips have also been devised utilizing a two-piece construction having two portions hinged to each other along an axis parallel to the elongated direction of the rod handle. Also, finger grips have been used in the past to provide comfort for the fingers but not for the palm which engages the reel seat components on the opposite side of the handle from the reel.

Fishing rod grips like those described above are shown by the following U.S. Pat. Nos. 2,526,293; 2,826,852; 3,295,244; and 3,410,017.

SUMMARY OF THE INVENTION

An object of the present invention is to provide a fishing rod hand grip having a sheet like construction made from a generally flexible material and adaptable to be wrapped about a fishing rod handle of the type which has a reel stem projecting therefrom so that opposite edge portions of the grip overlap each other, with at least one of the overlapped edge portions having an opening receiving the reel stem, and with the overlapped edge portions detachably secured to each other so as to removably mount the grip on the handle.

In the preferred embodiment of the fishing rod hand grip, the overlapping edge portions of the grip are each provided with an opening for receiving the reel stem. The opening of each edge portion is defined by a pair of flanges on which Velcro strips are mounted so as to provide detachable securement of the edge portions to each other when the grip is mounted on the handle. The flanges of each edge portion define V-shaped configurations so that the mounted grip tapers in each direction from the reel stem with frustoconical configurations that permit the grip to accommodate a base of the reel stem as well as the reel seat components of the handle that mount the stem base to the handle. The sheet like construction of the grip is provided by two layers of cloth secured to each other with a layer of foam padding therebetween so as to give the grip a padded feel.

Other objects, features and advantages of a fishing rod hand grip constructed according to the present invention will become readily apparent from the following detailed description of the preferred embodiment taken in connection with the accompanying drawings.

BRIEF DESCRIPTION OF THE DRAWINGS

FIG. 1 is a view showing a fishing rod handle that mounts a removable hand grip of the present invention;

FIG. 2 is a view which shows the hand grip removed from the rod handle and laid out in a flat configuration to show its outline;

FIG. 3 is a view of the hand grip removed from the rod handle as in FIG. 2 but with one of the edge portions turned to show Velcro strips thereon which are used to detachably mount the grip to the handle; and FIG. 4 is a sectional view of the grip taken along line 4—4 of FIG. 2 to show its sheet like construction.

DETAILED DESCRIPTION OF THE PREFERRED EMBODIMENT

With reference to FIG. 1 of the drawings, a fishing rod handle indicated by reference numeral 10 mounts a spinning reel 12 by way of a reel stem 14. The handle 10 is shown covered by a removable hand grip 16 of the present invention and includes a reel seat 18 whose components secure a base 20 of the reel stem to the handle. The reel seat 18 includes a fixed attachment ring 22 encircling the rod handle and having an enlarged portion 24 that receives one end of the stem base 20. The other end of the stem base 20 is received within an enlarged portion 26 of a second attachment ring 28 that also encircles the rod handle. Attachment ring 28 is slidable along the handle away from fixed attachment ring 22 and thus permits the stem base 20 to be released from the attachment rings. An adjustment ring 30 of the reel seat is threaded onto a threaded portion 32 of the handle so that it can be moved axially in either direction by being rotated in the proper direction. The adjustment ring is moved toward the attachment ring 28 to engage it and securely clamp the stem base 20 between the two attachment rings upon mounting of the reel. Of course, the mounting or demounting of the reel 12 is done with the hand grip 16 removed from the handle.

With additional reference to FIGS. 2 through 4, the hand grip 16 of the present invention has a generally sheet like construction and is made from a suitable flexible material such as some form of cloth. Particular reference to FIG. 4 shows that the sheet like construction includes two layers of cloth 34 and a layer of foam padding 36 positioned between the cloth layers. Any suitable means such as stitching 38 at the marginal edge of the grip and elsewhere as required secures the layers of the grip to each other. The grip 16 is wrapped about the rod handle 10 subsequent to mounting of the reel 12 in order to provide a padded area for a rod user to grip the handle adjacent the reel. The handle may be grasped with one or more fingers on either side of the reel stem 14 without touching the components of the reel seat 18.

When the hand grip 16 is wrapped about the handle 10, opposite edge portions 40 of the grip overlap each other in alignment with the reel stem 14. Each edge portion 40 includes a pair of spaced flanges 42 that are oriented in V-shaped configurations with respect to each other pointing in opposite directions as viewed in FIG. 2. Adjacent ends of each pair of flanges 42 are spaced from each other to define V-shaped openings 44. With the grip 16 wrapped about the rod handle 10, the openings 44 in the overlapped edge portions 40 receive the reel stem 14 from opposite sides of the stem. The grip 16 thus surrounds the reel stem and completely covers the reel seat of the handle.

The edge portions 40 of the grip are detachably secured to each other in their overlapping relationship by Velcro strips 46 on each flange 42 of the edge portions. As seen in FIG. 3, the Velcro strips 46 of each edge portion 40 are secured to their respective flanges 42 on opposite sides of the grip so that they engage each other in the overlapping relationship of the edge portions shown in FIG. 1 and thereby provide the detachable securement of the hand grip to the handle. The Velcro strips 46 are secured to the grip flanges 42 by any suitable means such as stitching. It is not necessary for the layer of foam padding 36 to extend to the marginal edges of the grip adjacent the Velcro strips since the Velco strips themselves provide padding to the grip.

The V-shaped configurations of the flanges 42 on each edge portion 40 gives the mounted hand grip 16 a configuration that tapers in opposite directions from the reel stem 14 along the handle 10 with frustoconical configurations. The mounted hand grip 16 thus has a greater diameter adjacent the reel stem 14 to accommodate its base 20 as well as the components of the reel seat.

While a preferred embodiment of the invention has been described in detail, those skilled in the art will recognize alternative constructions embodying the invention as described in the following claims.

What is claimed is:

1. A removable hand grip for use on a fishing rod handle of the type that mounts a reel having a stem projecting outwardly from the handle, the grip having a sheet like construction made from a generally flexible cloth-like material, said grip having a pair of edge portions that overlap when the grip is wrapped around a fishing rod handle, each of said edge portions including a pair of flanges spaced longitudinally from each other so that when the flanges overlap each other the space between the pairs of flanges defines an opening for receiving the stem projecting from the handle so that the grip covers the handle around the stem, each of said overlapping edge portions being of a generally flexible cloth-like construction, and means for detachably securing the overlapping edge portions to each other to removably mount the grip on the handle.

2. A grip according to claim 1 wherein the securing means includes Velcro strips on the overlapping edge portions.

3. A grip according to claim 1 wherein said pair of spaced flanges are arranged in a V-shaped configuration pointing away from the other pair of flanges when the grip is in a planar condition prior to mounting on the rod handle, the adjacent ends of each pair of flanges defining said opening receiving the rod stem when the grip is wrapped about the handle, and the V-shaped configurations of the flanges causing the grip to taper away from the stem in opposite directions along the handle with frustoconical configurations so the grip can accommodate a base of the reel stem which mounts the stem to the handle.

4. A hand grip according to claim 3 wherein the openings defined by the pairs of flanges have V-shaped configurations.

5. A hand grip according to claim 3 wherein the flanges of each edge portion each have a Velcro strip secured thereto to provide the means for detachably securing the edge portions to each other in their overlapping relationship.

6. A hand grip according to claim 1 wherein the sheet like construction of the grip is provided by two layers of flexible material which are secured to each other to give the grip a padded feel.

7. A hand grip according to claim 6 wherein a layer of padding is received between the two layers of flexible material to increase the padded feel of the grip.

8. A hand grip according to claim 7 wherein the layer of padding is composed of a foam material.

9. A removable hand grip for use on a fishing rod handle of the type that mounts a spinning reel having a stem projecting outwardly from the handle, the grip having a sheet like construction made from a generally flexible clothlike material and having a pair of edge portions that overlap when the grip is wrapped around a fishing rod handle, each of said edge portions including a pair of flanges spaced longitudinally from each other so that when the flanges overlap each other the space between the pairs of flanges defines an opening for receiving the stem projecting from the handle so that the grip covers the handle around the stem, each of said overlapping edge portions being of a generally flexible clothlike construction, and Velcro strips on the flanges so as to detachably secure the edge portions to each other in their overlapping relationship and thereby removably secure the grip to the handle.

* * * * *